United States Patent
Ehrlich et al.

(10) Patent No.: US 10,376,949 B2
(45) Date of Patent: Aug. 13, 2019

(54) HOLLOW SHANK RIVET AND RIVET COUPLING METHOD

(71) Applicant: Wabash National, L.P., Lafayette, IN (US)

(72) Inventors: Rodney P. Ehrlich, Monticello, IN (US); David P. Kunkel, Lebanon, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 15/815,003

(22) Filed: Nov. 16, 2017

(65) Prior Publication Data

US 2018/0141107 A1    May 24, 2018

Related U.S. Application Data

(60) Provisional application No. 62/423,955, filed on Nov. 18, 2016.

(51) Int. Cl.
| | |
|---|---|
| *B21J 15/02* | (2006.01) |
| *B21J 15/04* | (2006.01) |
| *F16B 19/10* | (2006.01) |
| *B21J 15/14* | (2006.01) |
| *B21J 15/10* | (2006.01) |

(52) U.S. Cl.
CPC ........... *B21J 15/043* (2013.01); *B21J 15/022* (2013.01); *B21J 15/04* (2013.01); *B21J 15/147* (2013.01); *F16B 19/10* (2013.01); *B21J 15/10* (2013.01)

(58) Field of Classification Search
CPC ........ B21J 15/043; B21J 15/022; B21J 15/10; B21J 15/04; B21J 15/147; F16B 19/10

USPC ...................... 411/501; 29/243.521
See application file for complete search history.

(56) References Cited

U.S. PATENT DOCUMENTS

| | | | | |
|---|---|---|---|---|
| 3,082,512 A | * | 3/1963 | Scheldorf | ............. F04B 39/108 29/512 |
| 3,995,406 A | * | 12/1976 | Rosman | ................... B21J 15/02 29/243.53 |

(Continued)

OTHER PUBLICATIONS

Alibaba.com, Hollow Tubular Rivets Wholesale, Tubular Rivets Suppliers, https://www.alibaba.com/showroom/hollow-tubular-rivets.html, 5 pages, accessed Jan. 10, 2018.

(Continued)

*Primary Examiner* — David B Jones
(74) *Attorney, Agent, or Firm* — Quarles & Brady LLP

(57) ABSTRACT

A method for coupling a first structure to a second structure is disclosed. The method includes providing a rivet having a shaft with a first end and a second end, a head positioned at the first end, and a cavity formed in the second end and extending along an axis of the shaft. The method also includes positioning the first structure and the second structure against each other and inserting the second end through the first structure and the second structure until the head contacts the first structure and the second end extends past the second structure. The method further includes positioning a first flat tool and a second flat tool against the head and the second end, respectively, and moving the first flat tool and the second flat tool toward each other until the second end expands radially against the second structure.

19 Claims, 7 Drawing Sheets

(56) References Cited

U.S. PATENT DOCUMENTS

| | | | | | |
|---|---|---|---|---|---|
| 4,007,540 | A | * | 2/1977 | Tyree | B21J 15/02 |
| | | | | | 29/509 |
| 4,088,053 | A | * | 5/1978 | Tyree | B21J 15/02 |
| | | | | | 411/501 |
| 4,146,118 | A | * | 3/1979 | Zankl | F16D 69/0408 |
| | | | | | 188/250 G |
| 4,221,041 | A | * | 9/1980 | Hufnagl | B21J 15/02 |
| | | | | | 29/512 |
| 5,738,475 | A | * | 4/1998 | Chaban | E05D 5/12 |
| | | | | | 16/193 |
| 6,662,911 | B1 | * | 12/2003 | Nugier | F16B 19/06 |
| | | | | | 188/250 G |
| 2013/0000101 | A1 | * | 1/2013 | Rintelmann | F16B 19/00 |
| | | | | | 29/525.03 |
| 2013/0125376 | A1 | * | 5/2013 | Keener | B21J 15/02 |
| | | | | | 29/525.06 |

OTHER PUBLICATIONS

Amazon.com, Tubular & Semi-Tubular Rivets, https://www.amazon.com/tubular-semi-tubular-rivets/b?node=16410511, 6 pages, accessed Jan. 10, 2018.

Amazon.com, Hollow Rivets, https://www.amazon.com/hollow-rivets/s?ie=UTF8&page=1&rh=i%3Aaps%2Ck%3Ahollow%20rivets, 5 pages, accessed Jan. 10, 2018.

Doityourself.com, 5 Advantages of Using Solid Rivets, https://www.doityourself.com/stry/5-advantages-of-using-solid-rivets, 2 pages, accessed Jan. 10, 2018.

National Rivet & Manufacturing Co., Oval Head Semi-Tubular Rivet, http://www.nationalrivet.com/custom-rivets/oval-head-semi-tubular-rivet.html, 2 pages, accessed Jan. 10, 2018.

* cited by examiner

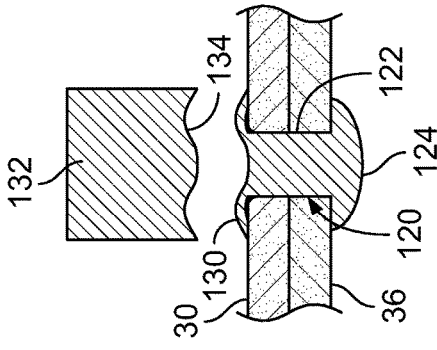
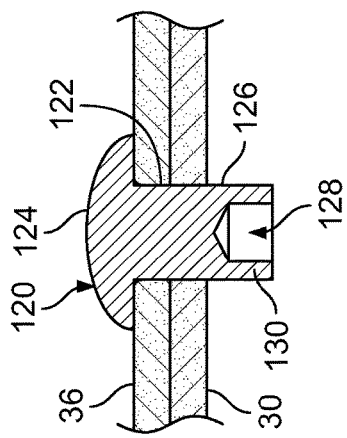
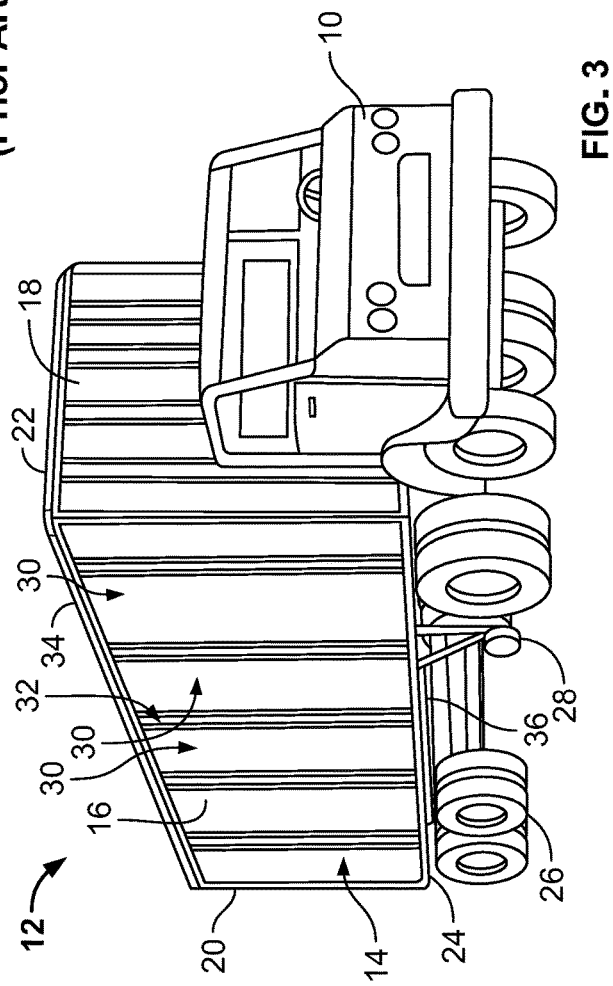

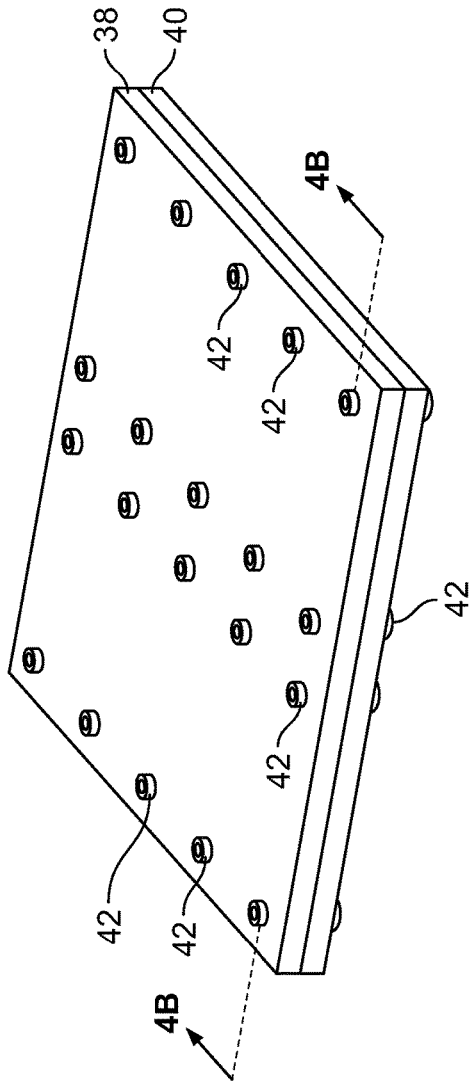
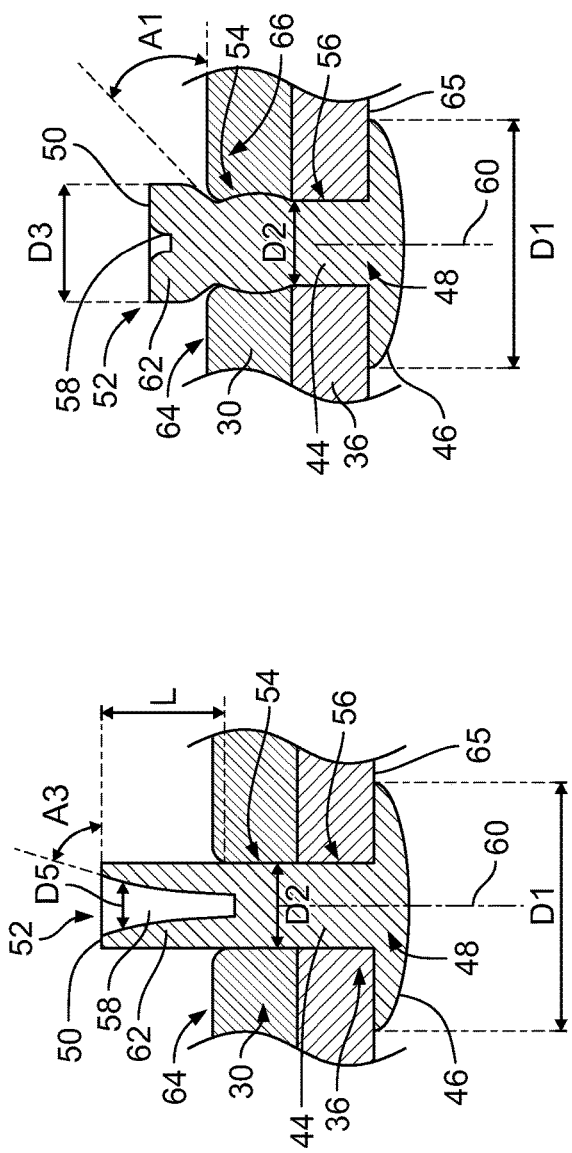

HOLLOW SHANK RIVET AND RIVET COUPLING METHOD

CROSS-REFERENCE TO RELATED APPLICATIONS

This application claims the benefit of U.S. Provisional Application Ser. No. 62/423,955, filed Nov. 18, 2016, and entitled "Hollow Shank Rivet and Rivet Coupling Method," the disclosure of which is hereby incorporated by reference in its entirety.

BACKGROUND

Tractor-trailers generally include a floor assembly supporting a container. The container includes sidewalls, which can be made up of multiple wall panels coupled to each other and to base rails of the floor assembly, often by rivets. Rivets can support both tensile loads (i.e., loads parallel to an axis of the rivet shaft) and shear loads (i.e., loads perpendicular to the rivet shaft axis). Generally, conventional solid bucking rivets 100, such as the one shown in FIGS. 1A-1C, are used. While the bucked side of each rivet is usually positioned against the metal base rail (that is, opposite the wall panel), some applications require the bucked side to be positioned against the wall panel.

Wall panels are generally made of composite materials that can be constructed of, for example, a plastic core positioned between and bonded to two metal skins. When the bucked side 102 of a rivet 100 is positioned against the wall panel 104 rather than the base rail 106, as shown in FIG. 1B, forces applied to the rivet 100 or the wall panel 104 can cause the core material to stretch and the metal skin to deform, thus enlarging a hole or channel 108 through which the rivet 100 is inserted. For example, forces against the wall panel 104, such as from items in the container pushing against the wall panel 104, can cause the wall panel 104 to push away from the rivet 100. As shown in FIG. 1C, this causes the hole 108 to enlarge as the bucked side 102 is pulled through the wall panel 104, thus uncoupling the wall panel 104 from the base rail 106.

Under conventional thinking, one solution to the above-described rivet push-off problem is to apply more force when setting the solid rivets, thus increasing the diameter of the bucked head and providing a steeper angle between the bucked head and the metal skin. However, contrary to the conventional understanding of rivet assembly in the industry, it has recently been found that the additional force applied against the bucked head often causes the core material to stretch, thereby enlarging the hole housing the rivet and thus exacerbating the original problem. Another solution to the rivet push-off problem is to use a softer rivet. However, while softer rivets can prevent pull-out due to tensile loads, they lack the shear strength necessary to handle imposed shear loads.

Yet another solution to the rivet push-off problem is to use tubular (or semi-tubular) rivets 120, as shown in, for example, FIG. 2A. The tubular rivets 120 generally include a shaft 122, a head 124 positioned at a first end of the shaft 122, and a tail 126 formed at a second end of the shaft 122. A cavity 128 is formed in the tail 126, the cavity 128 having a diameter that is less than a diameter of the tail 126, thereby forming a circumferential portion 130 that can be rolled outwardly during setting. Typically, the circumferential portion 130 of tubular rivets 120 is thin to provide for ease in setting. For example, a diameter of the cavity 128 may be ¾ or more of a diameter of the shaft 122. A setting tool 132 for bucking or setting the rivets 120 of FIG. 2A is depicted in FIG. 2B. The setting tool 132 has an edge 134 that has a central projection and curved edges extending from the central projection to generally form a wave. During setting the rivets 120, the central projection of each tool 132 (a tool is needed for each rivet) is aligned with the cavity 128 and outer portions of the tool 132 cause the circumferential portion 130 to roll outward into contact with the surface to which the rivets 120 are attached. The problem with such rivets 120 is that these specialized setting tools 132 are necessary to ensure the bucked head is set properly (i.e., that edges of the bucked head properly roll radially outward). As a result, such rivets (having a relatively think circumferential portion 130) cannot effectively be set using current setting processes like flat presses without deforming the rivet and rendering it useless. More specifically, without the formed rivet dies, tubular rivets often roll off-center during bucking, causing a weaker coupling. Furthermore, even with special tooling, multiple tubular rivets cannot be set simultaneously unless the rivets are specifically spaced apart to correspond to mating rivet dies on the special tooling. In container applications, rivets are generally not aligned perfectly horizontally or vertically, making it unfeasible to use these special tooling pieces for multiple rivets simultaneously. Thus, conventional tubular rivets require additional setting time and additional costs for special tooling.

SUMMARY

The present disclosure may comprise one or more of the following features and combinations thereof.

According to one embodiment of the present disclosure, a method for coupling a first structure to a second structure is provided. The method includes providing a rivet having a shaft with a first end and a second end, a head positioned at the first end, and a cavity formed in the second end and extending along an axis of the shaft. The method also includes positioning the first structure and the second structure against each other and inserting the second end of the shaft through the first structure and the second structure until the head contacts the first structure and the second end extends past the second structure. The method further includes positioning a first flat tool and a second flat tool against the head and the second end, respectively, and moving the first flat tool and the second flat tool toward each other until the second end expands radially against the second structure.

According to another embodiment, a rivet is provided. The rivet includes a shaft with a first end and a second end, a head positioned at the first end, and a cavity formed in the second end and extending along an axis of the shaft. The rivet further includes a tubular tail section formed in the second end around the cavity, the tubular tail section having an end surface opposite the head and, when the rivet is set, the end surface is spaced from and faces away from a surface to which the rivet is attached.

According to a further embodiment a rivet is provided. The rivet includes a shaft with a first end and a second end, the second end having a first diameter, the shaft being formed of a heat-treated metal, a head positioned at the first end and a cavity formed in the second end and extending along an axis of the shaft, the cavity having a second diameter, the second diameter being between about one-fourth and about one-half of the first diameter.

These and other features of the present disclosure will become more apparent from the following description of the illustrative embodiments.

BRIEF DESCRIPTION OF THE DRAWINGS

FIG. 2A is a cross-sectional view of a conventional hollow rivet inserted through a base rail and a wall panel;

FIG. 2B is a cross-sectional view of the hollow rivet of FIG. 2A after being set, and depicting a tool used for setting the hollow rivet;

FIG. 3 is a perspective view of a container assembled and coupled to a trailer, in part, using the rivet setting method described herein;

FIG. 4 is a perspective view of two structures coupled together using the rivet setting method described herein;

FIG. 5A is a cross-sectional view taken generally along the lines 5B-5B of FIG. 4 and depicting an embodiment of a rivet positioned through the two structures of FIG. 4 with the rivet in a preset state;

FIG. 5B is a cross-sectional view of the rivet of FIG. 5A, taken generally along the lines 5B-5B of FIG. 4 and depicting a single rivet after being set;

DETAILED DESCRIPTION

Figures 1A, 1B, 1C:
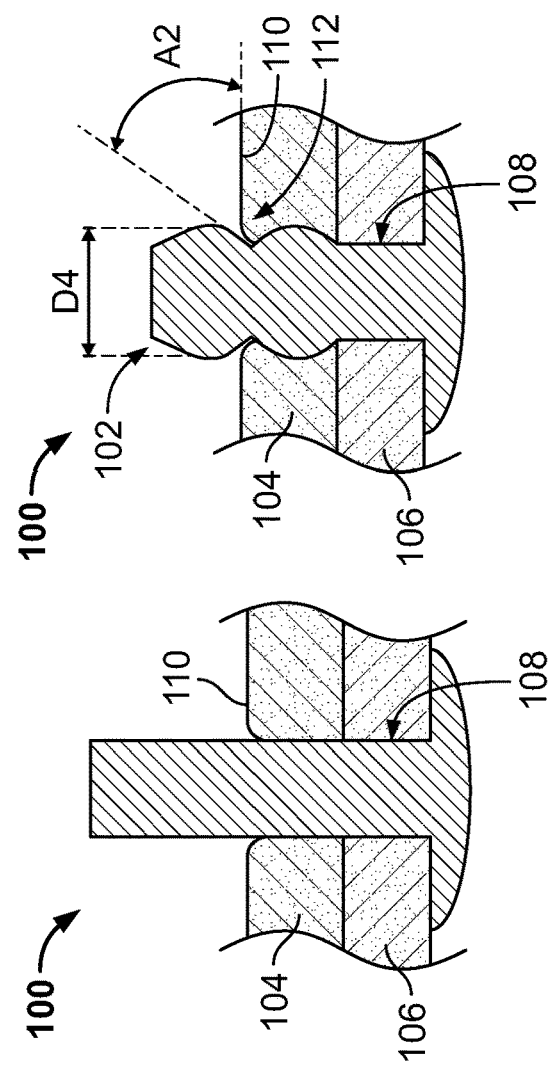
FIG. 1A is a cross-sectional view of a conventional solid rivet inserted through a base rail and a wall panel.
FIG. 1B is a cross-sectional view of the solid rivet of FIG. 1A after being set.
FIG. 1C is a cross-sectional view of the set solid rivet of FIG. 1B during a panel push-off.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

For the purposes of promoting an understanding of the principles of the invention, reference will now be made to a number of illustrative embodiments shown in the attached drawings and specific language will be used to describe the same. While the concepts of this disclosure are described in relation to a trailer for a tractor, it will be understood that that they are equally applicable to other trailers generally, and more specifically to pup trailers, conventional flat-bed and/or box or van type trailers, examples of which include, but should not be limited to, straight truck bodies, small personal and/or commercial trailers and the like.

A tractor 10, as shown in FIG. 3, can be coupled to one or more trailers 12 for transporting goods along a roadway. The trailer 12 can include a body 14 formed from a pair of rectangular side walls 16, a front wall 18, rear doors 20, a top panel or roof 22, and a floor assembly 24. The floor assembly 24 can be supported by a rear undercarriage assembly 26 and can include landing gear 28 secured thereunder. The side walls 16 can include one or more wall panels 30 coupled together by joints 32. Furthermore, the roof 22 and an upper portion of each wall panel 24 can be coupled to a top rail 34 while the floor assembly 24 and a lower portion of each wall panel 34 can be coupled to a base rail 36.

The wall panels 30 may be made from a composite material, metal, or any other suitable material or materials. For example, the composite material can include a plastic core and metal outer skins coupled to the plastic core, for example a honeycomb core, making the composite material rigid but lightweight and durable. In one application, each wall panel 30 can be made of a DURAPLATE® composite panel provided by Wabash National Corporation of Lafayette, Ind. Generally, DURAPLATE® composite panels are constructed of a high-density polyethylene plastic core bonded between two high-strength metal skins. The skins can be formed of a metal or metallic composition, examples of which include, but should not be limited to aluminum, galvanized steel, full hardened steel, such as AISI Grade E steel, or the like. In one illustrative embodiment, for example, the outer skin is formed of ASTM G90 galvanized steel, and the inner skin is formed of ASTM G40 galvanized steel. In alternative embodiments, the inner and/or outer skins respectively can be formed of other rigid, semi-rigid, metallic or non-metallic materials. The core can be approximately between 0.08 inch and 0.50 inch thick, with a preferred thickness of approximately 0.30 inch thick. In other applications, each wall panel 30 can be made of a glass reinforced thermoplastic composite. In other embodiments, the core may be formed of a perforated foam core (with or without the skins described above). It should be understood that other suitable composite materials can be used as well, including other types of inner cores. Further, the wall panels 30 can be of any number of suitable, non-composite materials such as metals, metal alloys, and/or plastics, for example. Additionally, the base rail 36, the top rail 34, and/or the joints 32 can be made of solid metal or any other suitable material.

According to some embodiments, the wall panels 30 can be coupled to the base rail 36, the top rail 34, and/or the joints 32 using a rivet coupling. More specifically, as shown in FIG. 4, a first structure 38 (such as the base rail 36, the top rail 34, the joints 32, and/or any other suitable structure) is coupled adjacent to a second structure 40 (such as the wall panel 30 and/or any other suitable structure) by one or more rivets 42. The rivets 42 generally permanently couple the first structure 38 and the second structure 40 together and can prevent the structures 38, 40 from separating due to tensile or shear forces.

FIGS. 5A and 5B show a rivet 42 according to one embodiment of the disclosure, in a preset and a set, or bucked, state, respectively. As shown in FIG. 5A, the rivet 42 can include a shaft 44, a head 46 positioned at a first end 48 of the shaft 44, and a tail 50 formed at a second end 52 of the shaft 44. The head 46 is generally circular in shape and includes a diameter D1 larger than a diameter D2 of the shaft 44.

Generally, to couple together two structures, such as the wall panel 30 and the base rail 36, the rivet 42 is pushed or inserted tail-first through holes or channels 54, 56 formed through the two structures 30, 36, respectively. To accommodate the rivet 42, the channels 54, 56 have diameters substantially equal to the shaft diameter D2. In some applications, as shown in FIGS. 5A and 5B, the rivet 42 is inserted first through the base rail 36, then the wall panel 30. In other applications, however, the rivet 42 can be inserted first through the wall panel 30, then through the base rail 36. Once the rivet 42 is inserted through the structures 30, 36, forces are applied against the head 46 and the tail 50 to squeeze, deform, set, or "buck" the tail 50. As shown in FIG. 5B, these forces cause a diameter D3 of the bucked tail 50 to spread or become larger than its original diameter (i.e., the diameter D2 of the shaft 44). The larger bucked tail diameter D3 and the head diameter D1, compared to the shaft diameter D2, permit the rivet 42 to hold the two structures 30, 36 together against shear and tensile forces. In some embodiments, the diameter D3 is between about 20% and about 50% greater than the diameter D2, between about 30% and about 40% greater than the diameter D2, or at least 20% greater than D2.

As shown in FIGS. 5A and 5B, the rivet 42 further includes a cavity 58 formed in the second end 52 of the shaft 44 along a central axis 60 of the shaft 44. In the preset state, shown in FIG. 5A, the cavity 58 can extend from the second end 52 a length L toward the first end 48 of the shaft 44. In some embodiments, the cavity 58 can include varying lengths L along the shaft 44 and varying angles A3 relative to a perpendicular of the shaft central axis 60. In other embodiments, the cavity 58 can be substantially tubular or cylindrical, wherein a diameter D5 of the cavity 58 does not vary along a length thereof.

In other illustrative embodiments, the cavity 58 can be substantially conical or frustoconical. In this manner, side walls forming the cavity 58 are at least partially tapered, as shown in FIGS. 5A and 5B. As a result, the diameter D5 of the cavity 58 varies along at least a portion of the length L thereof and, more specifically, decreases along at least a portion of the length L from a first point at or adjacent the tail 50 toward a second point within the shaft 44. In other words, the sidewalls include a tapered portion that extends inwardly from the first point adjacent the tail 50 toward the first end 48 of the shaft 44. In some embodiments, the entire length L of the cavity 58 is tapered. In other embodiments, some portions of the length L can be tapered (i.e., with a varied diameter D5 along those portions) and other portions of the length L can be substantially straight (i.e., with an equal diameter D5 along those portions).

Illustratively, the side walls of the cavity 58 can be tapered at an angle A3 between about seventy degrees to about eighty-five degrees, or between about seventy degrees to about ninety degrees. In one example, the angle A3 is about seventy degrees. In another example, the angle A3 is about seventy-five degrees. In yet another example, the angle A3 is about eighty degrees. In a further example, the angle A3 is about eighty-five degrees. Generally, the angle A3 of the tapered cavity 58 can be dependent on the length L and/or the diameter D5 of the cavity 58. In some applications, tapering the cavity 58 can improve stability of the rivet 42 and/or reduce production costs compared to conventional rivets. In other embodiments, different shaped cavities 58 can be used.

The cavity 58 can allow the bucked tail 50 to have a substantially larger bucked diameter D3 than a diameter D4 of a bucked tail 102 of a comparable solid rivet 100 (as shown in FIGS. 1B-1C). Additionally, as shown in FIG. 5B, the cavity 58 can permit the bucked tail 50 to have a smaller angle A1 relative to a surface 64 of the wall panel 30 compared to an angle A2 (relative to a surface 110) created by the bucked tail 102 of the conventional solid rivet 100 of FIGS. 1B-1C. Furthermore, the cavity 58 can permit the bucked tail 50 to deform the wall panel surface 64 (at an intersection point 66 between the bucked tail 50 and the wall panel surface 64) less than a surface deformation (at an intersection point 112) created by the conventional solid rivet 100 of FIGS. 1B-1C. Still further, a core of the wall panel 30 may be deformed by the solid rivet 100, which also assists in preventing a good set. Each of the above features can assist in preventing the wall panel channel 54 from stretching and the wall panel 30 from pushing over the bucked tail 50 and off the rivet 42.

In some embodiments, the cavity 58 can have a diameter D5 that is less than the shaft diameter D2 to provide substantially thick walls 62 surrounding the cavity 58. In some embodiments, the diameter D5 can be between about one-fourth and about one-half of the shaft diameter D2, unlike thin-walled rivets, which generally include cavities with diameters up to about three-quarters of the shaft diameter D2. In one embodiment, the shaft diameter D2 can be about 0.25 inches and the cavity diameter D5 can be between about 0.0625 inches and about 0.125 inches.

Figure 6:
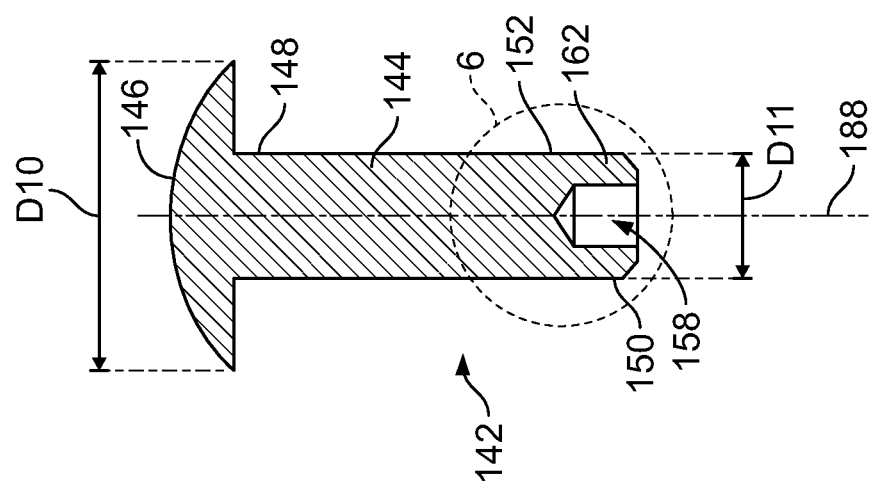
FIG. 6 is a cross-sectional view of a further embodiment of a rivet.

FIG. 6 shows a further embodiment of a rivet 142 in a preset state. As shown in FIG. 6, the rivet 142 includes a shaft 144, a head 146 positioned at a first end 148 of the shaft 144, and a tail 150 formed at a second end 152 of the shaft 144. The head 146 is generally circular in shape and includes a diameter D10 larger than a diameter D11 of the shaft 44.

Figure 8B:
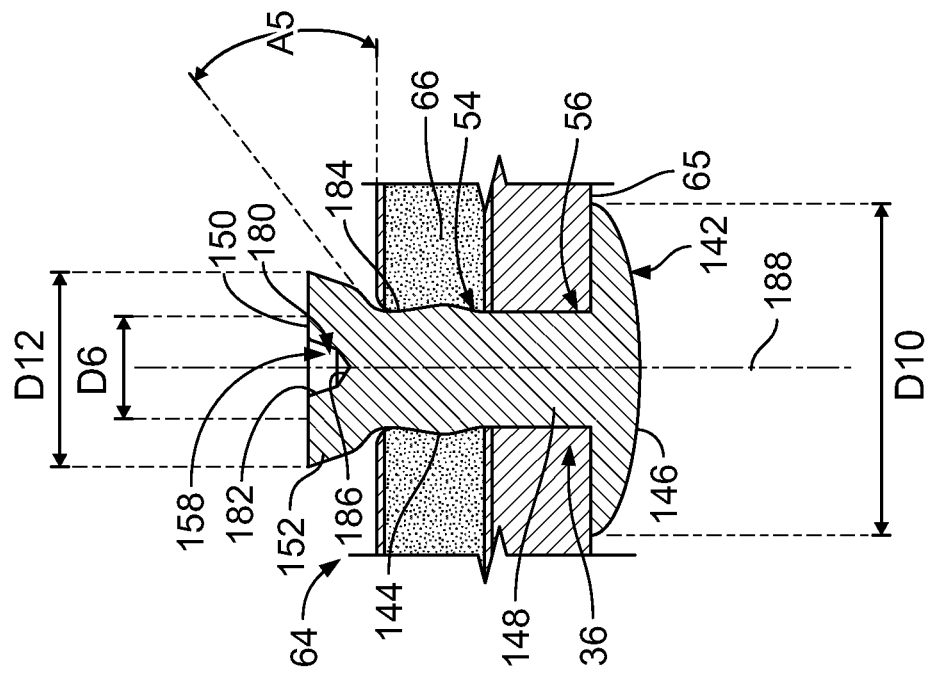
FIG. 8B is a cross-sectional view taken generally along the lines 5B-5B of FIG. 4 and depicting the rivet of FIGS. 6 and 7 after being set.
Figure 8A:
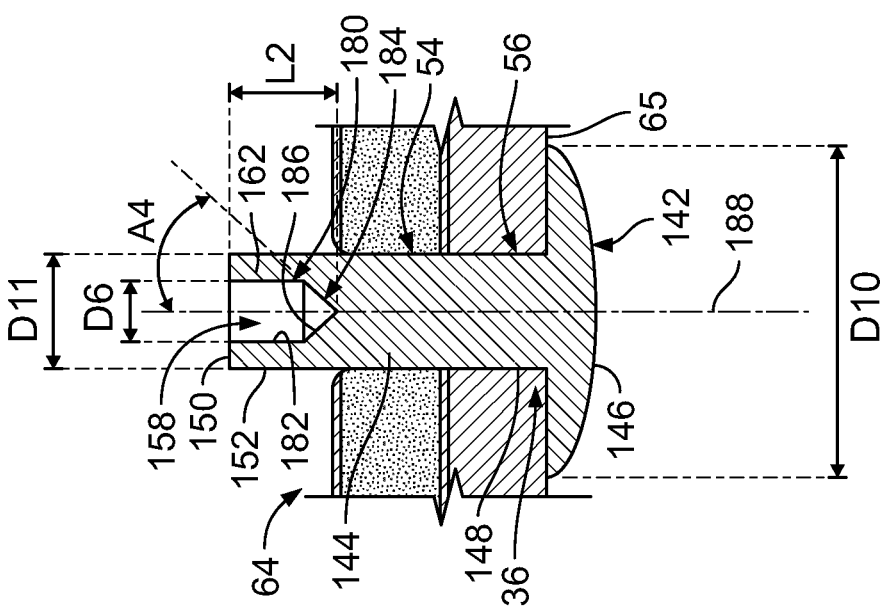
FIG. 8A is a cross-sectional view taken generally along the lines 5B-5B of FIG. 4, depicting the rivet of FIGS. 6 and 7 in a preset state.

Generally, to couple together two structures, such as the wall panel 30 and the base rail 36 (see FIG. 3), the rivet 142 is pushed or inserted tail-first through holes or channels 54, 56 formed through the two structures 30, 36, respectively. To accommodate the rivet 142, the channels 54, 56 have diameters substantially equal to the shaft diameter D11. In some applications, as shown in FIGS. 8A and 8B, the rivet 142 is inserted first through the base rail 36, then the wall panel 30. In other applications, however, the rivet 142 can be inserted first through the wall panel 30, then through the base rail 36. Once the rivet 142 is inserted through the structures 30, 36, forces are applied against the head 146 and the tail 150 to squeeze, deform, set, or "buck" the tail 150. As shown in FIG. 8B, these forces cause a diameter D12 of the bucked tail 150 to spread or become larger than its original diameter (i.e., the diameter D11 of the shaft 144). The larger bucked tail diameter D12 and the head diameter D10, compared to the shaft diameter D11, permit the rivet 142 to hold the two structures 30, 36 together against shear and tensile forces. In some embodiments, the diameter D12 is between about 20% and about 50% greater than the diameter D11, between about 30% and about 40% greater than the diameter D11, or at least 20% greater than D11.

Figure 7:
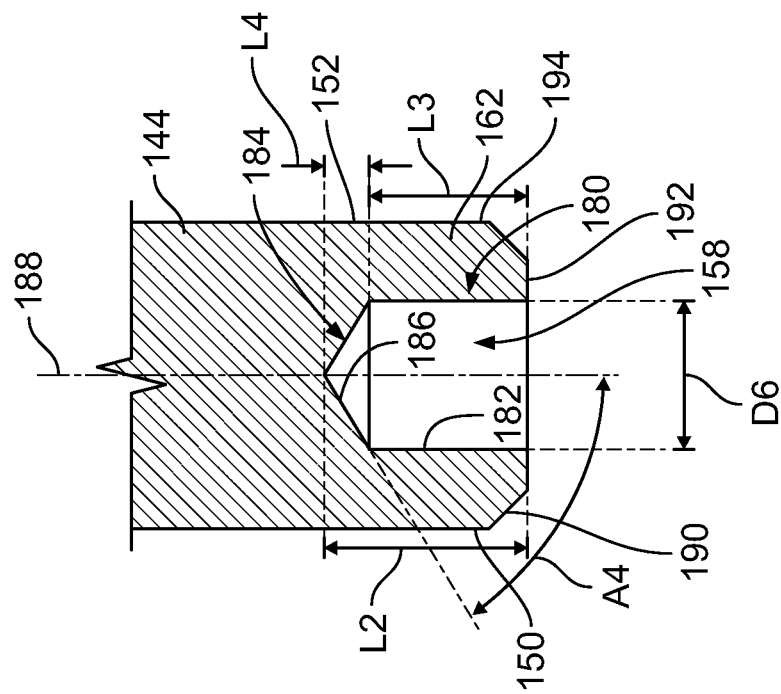
FIG. 7 is an enlarged view of the area labeled 6 in FIG. 8.

As shown in FIGS. 6 and 7, the rivet 142 includes a cavity 158 formed in the second end 152 of the shaft 144 along a central axis 160 of the shaft 144. In the preset state, shown in FIGS. 6-8A, the cavity 158 can extend from the second end 152 a length L2 toward the first end 148 of the shaft 144. In some embodiments, as best seen in FIG. 7, the cavity 158 can include a first segment 180 having a length L3, wherein the first segment 180 has a generally cylindrical inner wall 182. The cavity 158 can also include a second segment 184 having a length L4, wherein the second segment 184 has a generally conically-shaped wall 186. The conically-shaped wall 186 is tapered at an angle A4 with respect to a longitudinal axis 188 of the rivet 142. In some embodiments, the angle A4 is between about forty and about eighty degrees, or between about fifty and about seventy degrees, or about fifty-nine degrees.

Still referring to FIGS. 6-8A, the rivet 142 can further include an optional chamfer 190 on an outer surface of the second end 152 of the shaft 144. More particularly, the chamfer 190 is positioned in an end surface 192 of the second end 152 at an outer edge 194 thereof. In some embodiments, the chamfer 190 can be circumferential in that it can extend completely around the outer edge 194. In other embodiments, the chamfer 190 can be interrupted in that it can include one or more discrete chamfers that are not connected. If utilized, the chamfer 190 can assist in hole or cavity alignment for pre-punched holes.

The cavity 158 can allow the bucked tail 150 to have a substantially larger bucked diameter D12 than a diameter D11 of a bucked tail 102 of a comparable solid rivet 100 (as shown in FIGS. 1B-1C). Additionally, as shown in FIG. 8B, the cavity 158 can permit the bucked tail 150 to have a smaller angle A5 relative to a surface 64 of the wall panel 30 compared to an angle A2 (relative to a surface 110) created by the bucked tail 102 of the conventional solid rivet 100 of FIGS. 1B-1C. Furthermore, the cavity 158 can permit the bucked tail 150 to deform the wall panel surface 64 (at an intersection point 66 between the bucked tail 150 and the wall panel surface 64) less than a surface deformation (at an intersection point 112) created by the conventional solid rivet 100 of FIGS. 1B-1C. Each of the above features can assist in preventing the wall panel channel 54 from stretching and the wall panel 30 from pushing over the bucked tail 150 and off the rivet 142.

In some embodiments, the cavity 158 can have a diameter D6 that is less than the shaft diameter D11 to provide a substantially thick tubular wall 162 surrounding the cavity 158. In some embodiments, the diameter D6 can be between about one-fourth and about one-half of the shaft diameter D11, unlike thin-walled rivets, which generally include cavities with diameters up to about three-quarters of the shaft diameter D11. In one embodiment, the shaft diameter D11 can be about 0.25 inches and the cavity diameter D6 can be between about 0.0625 inches and about 0.140 inches or about 0.120 inches. In such embodiments, a thickness of the tubular wall 162 may be between about 0.11 and about 0.1875 inch or about 0.13 inch.

In some embodiments, for example as seen in FIGS. 8A and 8B, the wall panel 30 may be composite panel made of a core 200 with thin-walled skins 202a, 202b coupled to opposing sides of the core 200. In such embodiments, the core 200 may be made of plastic, a honeycomb material, a porous material, a foamed plastic, and/or any other suitable material. Further, the skins 202a, 202b may be made of, for example, metal. In some embodiments, the skins 202a, 202b are metal and may be less than or equal to 0.016 inch in thickness. While only FIGS. 8A and 8B are shown with wall panels 30 having a core 200, any of the embodiments disclosed herein (e.g., FIGS. 4, 5A, and 5B) may be utilized with such a wall panel.

It is difficult for the thinner metal skins 202a, 202b to grasp a solid rivet during setting. More particularly, during setting a solid rivet, a higher set force of about 2300 pounds is requires to flatten the rivet, which causes bulging or deformation of the solid rivet into the wall panel 30 (as seen in FIG. 1B). When the term "set force" is used in setting the rivets, it is meant that this is the set force required to set the rivets, not necessarily the set force applied by the tools setting the rivets. This deformation causes an outermost skin 202b to deform inwardly, which prevents the skin 202b from grasping the solid rivet. Still further, as noted above, setting of the solid rivet (with a higher set force of about 2300 pounds) causes the wall panel 30 (or a core of the wall panel 30) to deform more. In order to roll the circumferential portion 130 of the conventional tubular rivets 120 (of FIGS. 2A and 2B), a set force of less than 1000 pounds is required to set the rivets 120, and a set force of less than about 500 pounds may be required to set the rivets 120 of FIGS. 2A and 2B.

The rivets 42, 142 of FIGS. 4A, 4B and 7A, 7B, respectively, have been designed such that a lower set force (than for solid rivets) is required during setting (using flat tools), thereby decreasing the amount of bulge or deformation into the wall panel 30 and decreasing inward deformation (into the channel 54 formed in the wall panel 30) of the outermost skin 202b, which help retain the rivet 42, 142 within the wall panel 30 (i.e., increase pull-out strength of the rivet 42, 142). More particularly, a set force of about 2000 pounds is required to set the rivets 42, 142.

Figure 9:
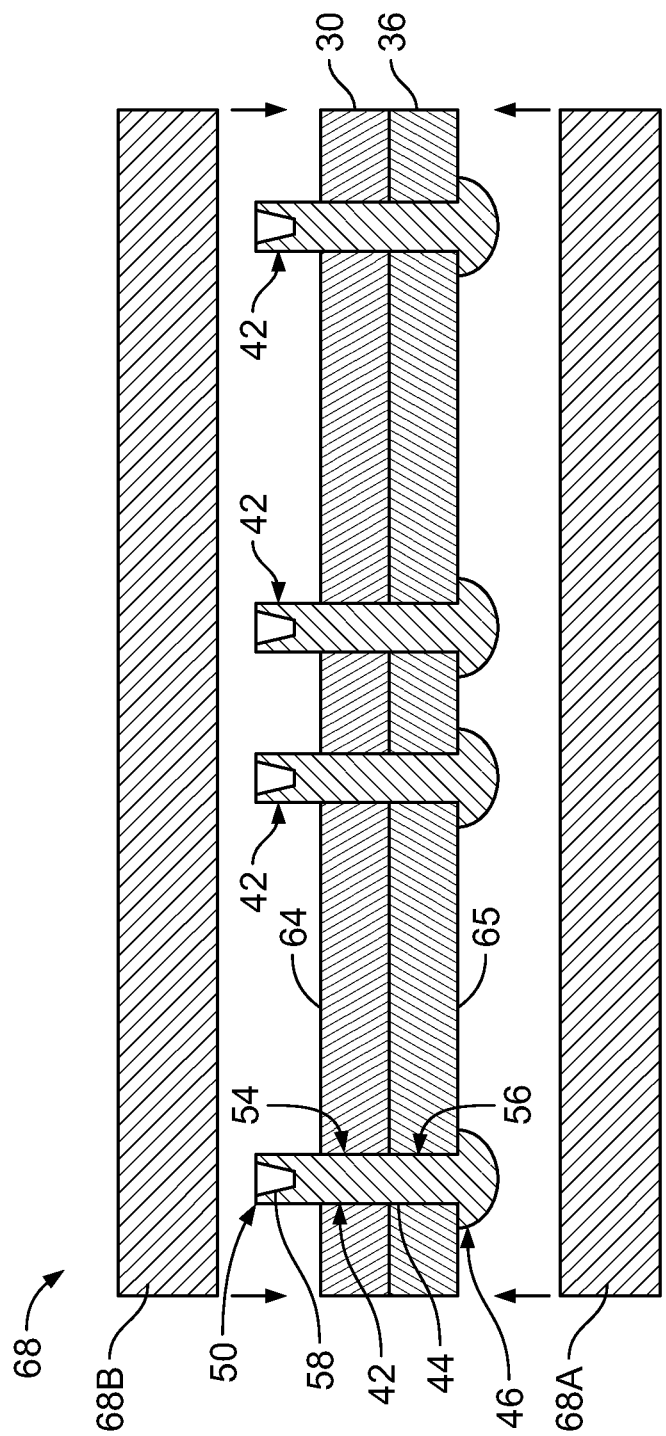
FIG. 9 is a cross-sectional view of two structures, the rivets of FIG. 5A (although any rivets can be utilized), and flat presses for setting the rivets according to the rivet setting method described herein.

When coupling structures together, the substantially smaller diameter cavity 158 and thicker wall 162 can permit a flat tooling surface to be used to set the tail 150 of the rivet 142. For example, as shown in FIG. 9, flat tools 68A, 68B, such as flat die press pieces, can be used to set the rivets 142. Generally, the flat tools 68A, 68B can apply forces perpendicular to the shaft 144 against both the head 146 and the tail 150 of the rivet 142. In this manner, the flat tools 68A, 68B uniformly flatten the tail 150 including the tubular wall 162. In contrast, as noted above, the flat tools 68A, 68B cause a bulging of a solid rivet (as seen in FIG. 1B) due to a higher force needed to buck or set the solid rivet or would cause an uneven flattening or crushing of the thin-walled rivet of FIG. 2A.

Figure 10:
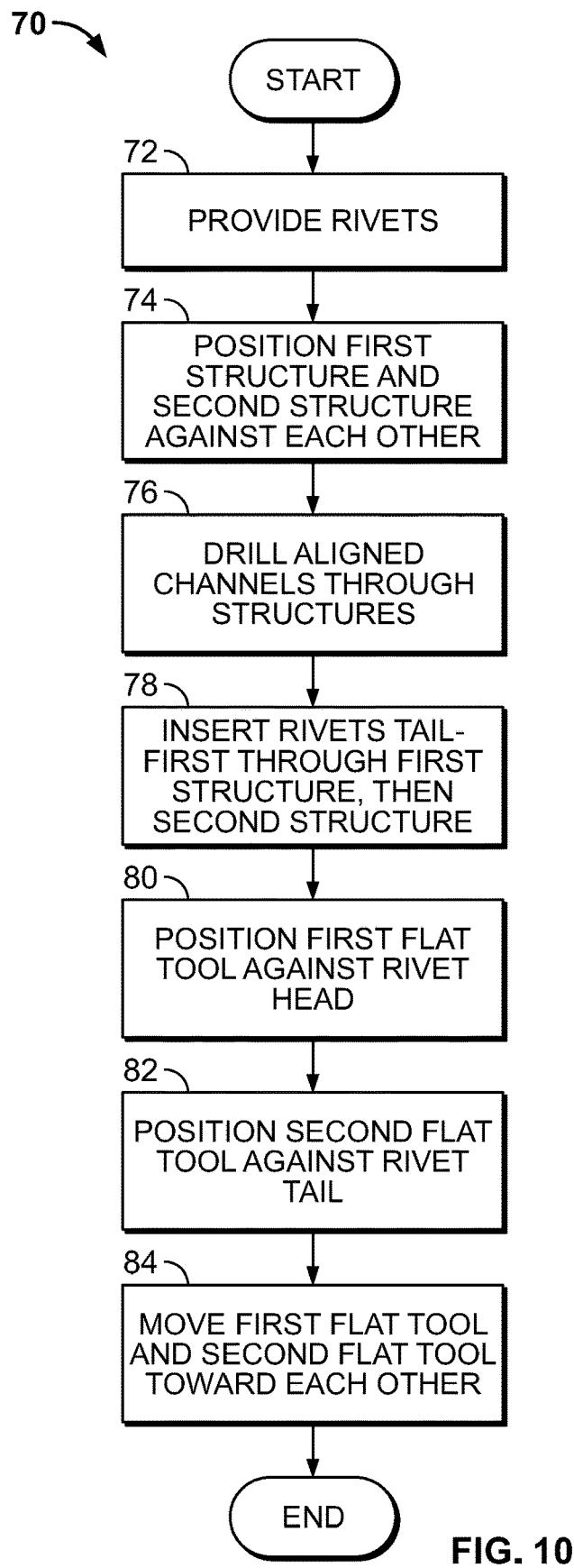
FIG. 10 is a flow diagram of a rivet setting method according to one embodiment of the disclosure.

More specifically, FIGS. 9 and 10 show a method 70 for coupling a first structure (such as the base rail 36) to a second structure (such as the wall panel 30), according to one embodiment of the disclosure. First, the method includes providing one or more rivets 42 and/or 142 at process block 72. Then, the first structure 36 and the second structure 30 are positioned against each other (e.g., the first structure 36 is positioned against the second structure 30 or the second structure 30 is positioned against the first structure 36) at process block 74 and channels 54, 56 are aligned and drilled through the structures 30, 36 at process block 76. In other illustrative embodiments, the channels 54, 56 can be drilled in the first and second structures 36, 30 prior to positioning the first and second structures 36, 30 adjacent one another. Once the channels 54, 56 are drilled and the structures 30, 36 are positioned adjacent one another, the tail 50 of each rivet 42 and/or 142 is inserted through the first structure 36 and the second structure 30 until each head 46 contacts a surface 65 of the first structure 36 and each tail 50 extends outwardly beyond the surface 64 of the second structure 30 at process block 78. In some embodiments, pre-drilling is unnecessary before inserting the rivets 42 and/or 142 into the structures 30, 36 and process block 76 is eliminated. In other embodiments, the channels 54, 56 may be punched or pre-punched.

Following rivet insertion, a first flat tool 68A is positioned against each head 46 and a second flat tool 68B is positioned against each tail 50 at process block 80. The first flat tool 68A and the second flat tool 68B are then moved toward each other with sufficient force until the tail 50 is squeezed or bucked (i.e., until the tail 50 sufficiently expands radially outward against the second structure 30) at process block 82.

The above method 70 permits multiple rivets 42 and/or 142 to be simultaneously set with the flat tools 68A, 68B. More specifically, the thicker walls 62 of the rivets 42 and/or 142 allow the tails 50 and/or 150 to flare outwardly without rolling off-center when using the flat tools 68A, 68B. Also, the cavity 58 and/or 158 can permit the bucked tail 50 and/or 150 to flare outward against the structure surface 64 with less force compared to the force necessary to set solid rivets. The decreased bucking force assists in preventing the wall panel channel 54 from stretching during the above rivet setting method 70. Furthermore, multiple rivets 42 and/or 142 can be positioned and set anywhere between the flat tools 68A, 68B, rather than in pre-set positions corresponding to conventional tooling with spaced-apart rivet settings, as is required with conventional rivets. In other words, the rivets 42 and/or 142 do not need to be aligned horizontally or vertically to correspond to rivet dies of conventional tooling, but rather can be set at different distances apart from each other. Accordingly, the rivets 42 and/or 142 can permit a faster and cheaper rivet setting process (e.g., by allowing readily available flat tooling 68 to set multiple misaligned rivets 42 and/or 142 simultaneously) and a stronger coupling between, for example, a wall panel 30 and a base rail 36 (e.g., by reducing the chances of the wall panel channel 54 stretching and causing the coupling to fail). While the method of FIGS. 9 and 10 depict a particular type of rivet, the method of FIGS. 9 and 10 can be utilized with any type of rivet.

While the principles of the present disclosure have been depicted as being utilized with particular structures, the coupling method described herein should not be limited to such structures. More particularly, the principles of the present disclosure can be utilized in conjunction with any rivet coupling in trailers.

It is oftentimes more difficult to hold a rivet within wall panels having one or more materials that have discontinuous or non-uniform sections, for example, a honeycomb or perforated core, as there is less material to hold the rivet in place. The principles of the present invention may be helpful in retaining rivets within wall panels having a discontinuous or non-uniform core with outer skins.

Any of the rivets of the present invention may be made from, for example, a hardened/heat-treated metal. In one particular embodiment, the rivets may be made from 2117T4. This is unconventional for hollow rivets, as generally hollow rivets are made of a ductile material to allow rolling of the circumferential portion 130 of the rivet (see FIG. 2B).

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, any of the features or functions of any of the embodiments disclosed herein can be incorporated into any of the other embodiments disclosed herein.

We claim:

1. A method for coupling a first structure to a second structure, the method comprising the steps of:
    providing a plurality of rivets, each rivet including:
        a shaft with a first end and a second end, a head positioned at the first end, and a cavity formed in the second end and extending along an axis of the shaft, the cavity having a diameter of between about one-fourth and about one-half of a diameter of the shaft;
    positioning the first structure and the second structure against each other;
    inserting the second end of the shaft of each rivet through the first structure and the second structure until the head contacts the first structure and the second end extends past the second structure;
    positioning a first flat tool against the head of each rivet;
    positioning a second flat tool against the second end of each rivet; and
    moving the first flat tool and the second flat tool toward each other until the second ends of the plurality of rivets simultaneously expand radially against the second structure.

2. The method of claim 1, wherein the first structure is one of a base rail and a wall panel and the second structure is the other of the wall panel and the base rail.

3. The method of claim 2, wherein the wall panel is a composite panel including a plastic core and metal outer skins coupled to the plastic core, and the base rail is metal.

4. The method of claim 1, wherein the step of positioning the first structure and the second structure against each other includes positioning the first structure, the second structure, and at least one further structure against each other.

5. The method of claim 1 further including the step of at least one of drilling and punching channels through each of the first structure and the second structure, the channels having a diameter approximately equal to a diameter of the shaft.

6. The method of claim 1, wherein the cavity of each rivet has a first portion and a second portion, the first portion extending from the second end and being substantially cylindrical in shape, the second portion extending from the first portion toward the head, the second portion being substantially conical in shape.

7. The method of claim 6, wherein the second portion is formed by a wall that is disposed at an angle of between about 50 and about 70 degrees with respect to the axis of the shaft.

8. The method of claim 7, wherein the angle is about 59 degrees.

9. The method of claim 1, wherein each rivet includes a circumferential chamfer at the second end in an outer edge of the shaft surrounding the cavity.

10. The method of claim 1, wherein a diameter of the second end of each rivet after expanding radially is 20% and about 50% greater than a diameter of the shaft.

11. A riveting system for a structure, the riveting system comprising:
 a plurality of rivets configured to extend through the structure, each rivet including:
  a shaft with a first end and a second end;
  a head positioned at the first end;
  a cavity formed in the second end and extending along an axis of the shaft; and
  a tubular tail section formed in the second end around the cavity, the tubular tail section having an end surface opposite the head;
 a first flat tool configured to engage the head of each rivet simultaneously; and
 a second flat tool configured to engage the second end of each rivet simultaneously,
 wherein, when the first flat tool is engaged with the head of each rivet, the second flat tool is engaged with the second end of each rivet, and the first flat tool and the second flat tool are moved toward each other, the first flat tool and the second flat tool are configured to simultaneously set each rivet of the plurality of rivets against a surface of the structure.

12. The riveting system of claim 11, wherein the structure includes a wall panel and a base rail, the wall panel comprising a core material and outer skins positioned on opposing sides of the core material.

13. The riveting system of claim 12, wherein the core material is comprised of a material with discontinuous or non-uniform sections.

14. The riveting system of claim 11, wherein the shaft of each rivet has a first diameter prior to setting, the cavity of each rivet has a second diameter prior to setting, and the second diameter is between about one-fourth and about one-half of the first diameter.

15. A riveting system comprising:
 a plurality of rivets, each rivet including:
  a shaft with a first end and a second end, the second end having a first diameter, the shaft being formed of a heat-treated metal;
  a head positioned at the first end;
  a cavity formed in the second end and extending along an axis of the shaft, the cavity having a second diameter, the second diameter being between about one-fourth and about one-half of the first diameter;
 a first flat tool configured to engage the head of each rivet simultaneously; and
 a second flat tool configured to engage the second end of each rivet simultaneously,
 wherein, when the first flat tool is engaged with the head of each rivet, the second flat tool is engaged with the second end of each rivet, and the first flat tool and the second flat tool are moved toward each other, the first flat tool and the second flat tool are configured to simultaneously set each rivet of the plurality of rivets.

16. The riveting system of claim 15, wherein the plurality of rivets are attached to a base rail and a wall panel, the wall panel comprising a core and metal skins coupled to opposing sides of the core, wherein the metal skins have a thickness of 0.016 inches or less.

17. The riveting system of claim 16, wherein the core is comprised of a material with discontinuous or non-uniform sections.

18. The riveting system of claim 16, wherein a tubular wall is formed in the second end of the shaft by the cavity and the tubular wall has an end surface opposite the head, wherein when the rivet it set, the end surface does not contact the wall panel.

19. A method for coupling a first structure to a second structure, the method comprising the steps of:
 providing a rivet including:
  a shaft with a first end and a second end, a head positioned at the first end, and a cavity formed in the second end and extending along an axis of the shaft, the cavity having a diameter of between about one-fourth and about one-half of a diameter of the shaft, the cavity having a first portion extending from the second end of the rivet, the first portion being substantially cylindrical in shape, and the rivet including a second portion extending from the first portion toward the head of the rivet, the second portion being substantially conical in shape, wherein the second portion is formed by a wall that is disposed at an angle of about 59 degrees with respect to the axis of the shaft;
 positioning the first structure and the second structure against each other;
 inserting the second end of the shaft of the rivet through the first structure and the second structure until the head contacts the first structure and the second end extends past the second structure;
 positioning a first flat tool against the head;
 positioning a second flat tool against the second end; and
 moving the first flat tool and the second flat tool toward each other until the second end expands radially against the second structure.

* * * * *